United States Patent Office 3,023,232
Patented Feb. 27, 1962

3,023,232
DIBASIC ACIDS AND SALTS THEREOF
Vernon H. Wallingford, Ferguson, Mo., assignor to Mallinckrodt Chemical Works, St. Louis, Mo., a corporation of Missouri
No Drawing. Filed Dec. 21, 1956, Ser. No. 629,780
8 Claims. (Cl. 260—513)

This invention relates to new dibasic acids, and more particularly to novel N,N'-dithiooxalylbis-amino acids and their salts.

Broadly, the invention is directed to amino acid derivatives of dithiooxamide having the formula:

$$R-\underset{\underset{S}{\|}}{C}-\underset{\underset{S}{\|}}{C}-R$$

in which R represents a radical derived from an aliphatic alpha-amino acid by removal of a hydrogen atom from the alpha-amino group.

More particularly, the invention is directed to the novel class of dibasic organic acids represented by the general formula:

$$A-R-NH-\underset{\underset{S}{\|}}{C}-\underset{\underset{S}{\|}}{C}-NH-R-A$$

in which R is a lower alkylene radical selected from the group consisting of methylene, polymethylene, and alkyl-substituted methylene radicals, and A is a monobasic organic acid radical selected from the group consisting of carboxyl and sulfonic radicals, and the salts thereof; and to amino acid derivatives of dithiooxamide having the formula:

$$R-\underset{\underset{S}{\|}}{C}-\underset{\underset{S}{\|}}{C}-R$$

which R represents a radical derived from an aliphatic ...ha-amino acid by removal of a hydrogen atom from ...e alpha-amino group. The present invention also includes novel methods for preparing N,N'-dithiooxalylbis-amino acids and their salts.

Among the objects of this invention are the provision of new dibasic acids; the provision of compounds of the type indicated which are derivatives of dithiooxamide; the provision of compounds of the type indicated which contain a plurality of functional groups; the provision of compounds of the type indicated which are useful intermediates for the preparation of other compounds of related structure; the provision of improved chelating agents; the provision of improved dyes; the provision of improved toners for photographic prints; the provision of improved diuretics; and the provision of methods for preparing compounds of the type referred to which are efficient and economical. Other objects and features will be in part apparent and in part pointed out hereinafter.

The invention accordingly comprises the products and methods hereinafter described, the scope of the invention being indicated in the following claims.

In accordance with the present invention, it has been found that the novel N,N'-dithiooxalylbis-amino acids represented by the formula:

$$A-R-NH-\underset{\underset{S}{\|}}{C}-\underset{\underset{S}{\|}}{C}-NH-R-A$$

where R is an alkylene radical selected from the group consisting of methylene, polymethylene and alkyl-substituted methylene and polymethylene radicals, and A is a monobasic acid radical, and the salts thereof, possess many useful and valuable properties. Included among the acids of this novel group of compounds are, for example, N,N'-dithiooxalylbis-aminoalkanoic acids, such as N,N'-dithiooxalylbis-amino-acetic acid,

HOOCCH$_2$NHCSCSNHCH$_2$COOH and N,N'-dithiooxalylbis-aminoalkanesulfonic acids, such as N,N'-dithiooxalylbis-2-aminoethanesulfonic acid,

HO$_3$SCH$_2$CH$_2$NHCSCSNHCH$_2$CH$_2$SO$_3$H

The compounds of this invention also include salts of these acids, such as, for example, the sodium, nickel, cobalt and copper salts.

Among the useful properties of the novel acids of the invention is the property of forming chelated or complex compounds with metallic ions. Many of these compounds, such as those formed with iron, nickel, cobalt, and copper are useful, for example, as textile dyes or toners for photographic prints. In addition, certain of the N,N'-dithiooxalylbis-aminoalkanoic acids of this invention possess surprising and valuable physiological properties. In particular, it has been found that N,N'-dithiooxalylbis-aminoacetic acid, N,N'-dithiooxalylbis-2-aminobutanoic acid, N,N'-dithiooxalylbis-4-aminobutanoic acid, and N,N'-dithiooxalylbis-2-aminopentanoic acid are effective diuretics. Moreover, they display a low order of toxicity at dosage levels which provide significant diuretic action.

It is well known that primary aliphatic amines react with dithiooxamide rather readily. However, when a similar reaction is attempted using an amino acid instead of an amine, little or no reaction takes place. It has now been found, however, in accordance with the present invention, that when dithiooxamide is heated in a suitable inert medium with a salt of a monobasic amino acid such as, for example, an aminoalkanoic acid or an aminoalkanesulfonic acid, the two reactants condense to form a salt of an N,N'-dithiooxalylbis-amino acid. The reaction between dithiooxamide and the sodium salt of glycine is illustrative and may be represented as follows:

2NH$_2$CH$_2$COONa+NH$_2$CSCSNH$_2$
→NaOOCCH$_2$NHCSCSNHCH$_2$COONa+2NH$_3$

The reaction is preferably carried out in a solution of the salt of the amino acid although the salt need not be completely dissolved to obtain satisfactory results. Water is the preferred reaction medium in most instances although other solvents, such as methanol and ethanol, are sometimes useful. Furthermore, while the sodium salt of the amino acid is most commonly used, other salts, such as the potassium salt, may also be used. The free N,N'-dithiooxalyl-bis-amino acid is precipitated by the addition of mineral acid to a solution of the salt. If the product thus obtained is not sufficiently pure it may be purified by means well known to the art. Various salts are conveniently prepared from the N,N'-dithiooxalylbis-amino acids by conventional methods. In some instances the salt may be conveniently isolated from the condensation reaction mixture without intermediate isolation of the free acid.

The following examples illustrate the invention.

EXAMPLE 1

*N,N'-Dithiooxalylbis-Aminoacetic Acid*

Sodium hydroxide solution (0.40 mol NaOH) was added to a mixture of glycine (30 g., 0.40 mol) and water (500 ml.) and dithiooxamide (24 g., 0.20 mol) was then added over a two hour period while the temperature of the mixture was maintained at 55–60° C. The clear dark brown solution was filtered at 60° C. and the filtrate was acidified by adding hydrochloric acid (0.84 mol HCl) with stirring and heating. The resulting slurry was cooled to 12° C. and the crude N,N'-dithiooxalylbis-aminoacetic acid was collected on a filter and washed once with water (75 ml.). The crude product was recrystallized from water (1800 ml.), the hot solution being treated with decolorizing charcoal. The purified N,N'-dithiooxalylbisaminoacetic acid, after drying at 75–80° C., weighed 25.6 g. (54% yield from starting material). Melting point, 225° C. (with decomposition). Calculated for $C_6H_8N_2O_4S_2$: N, 11.82%; S, 27.14%; neutral equivalent, 118. Found: N, 11.7%; S, 28.1%; neutral equivalent, 118.

EXAMPLE 2

N,N'-Dithiooxalylbis-2-Aminobutanoic Acid

Alpha-aminobutyric acid (102 g., 0.99 mol) and sodium bicarbonate (83.5 g., 0.99 mol) were dissolved in water and to the clear solution was added dithiooxamide (59.5 g., 0.495 mol) in portions with stirring. The mixture was heated at 40–50° C. for 7½ hours, then stirred overnight without heating. Next day the mixture was again heated at 40–50° C. for 7.5 hours and it was then stirred about 64 hours without further heating. The reaction mixture was then filtered and to the filtrate was added dilute hydrochloric acid (365 ml., 1.0 mol HCl). The cooled mixture was filtered and the brown residue of crude N,N'-dithiooxalylbis-2-aminobutanoic acid was dried at 100° C. for three hours. Yield: 100 g. (59%). A portion of the crude product was purified by recrystallizing it from methanol after treating the methanol solution with decolorizing charcoal. Yield of purified N,N'-dithiooxalylbis-2-aminobutanoic acid on recrystallization, 55%. M.P., 219° C. (with decomposition). Calculated for $C_{10}H_{16}N_2O_4S_2$: N, 9.58%; S, 21.93%; neutral equivalent, 146. Found: N, 9.07%; S, 22.34%; neutral equivalent, 150.

EXAMPLE 3

N,N'Dithiooxalylbis-4-Aminobutanoic Acid

2-Pyrrolidone (lactam of gamma-aminobutyric acid, 17.0 g., 0.20 mol) was hydrolyzed by heating it to reflux with concentrated sodium hydroxide solution (0.40 mol NaOH). To the resulting clear and cooled solution was added hydrochloric acid (0.40 mol HCl). Then sodium carbonate (10.6 g., 0.10 mol) was added, the mixture was heated, and to the resulting clear solution was added dithiooxamide (12.0 g., 0.10 mol). The reaction mixture was stirred 64 hours and then filtered. Dilute hydrochloric acid (0.20 mol HCl) was added and the orange-red precipitate was filtered off under reduced pressure and purified by recrystallizing it after treating the ethanol solution with decolorizing charcoal. The purified N,N'-dithiooxalylbis-4-aminobutanoic acid was in the form of pinkish-orange needles and weighed 14.1 g. Yield: 48% M.P.: 167–169° C. Calculated for $C_{10}H_{16}N_2O_4S_2$: N, 9.58%; S, 21.93%; neutral equivalent, 146. Found: N, 9.3%; S, 22.8%; neutral equivalent, 147.

EXAMPLE 4

N,N'-Dithiooxalylbis-2-Aminopentanoic Acid

Alpha-aminovaleric acid (98.4 g., 0.84 mol) was mixed with water (1 liter) sodium bicarbonate (70.7 g., 0.84 mol) was added in portions, and the mixture was stirred to complete solution. Dithiooxamide (50.3 g., 0.42 mol) was added and the mixture was stirred for seven hours at 40–50° C., then an additional 64 hours without further heating. The small remaining undissolved residue was filtered off, and dilute hydrochloric acid (0.85 mol HCl) was added rapidly to the filtrate. An oil separated which crystallized on stirring. The slurry was stirred overnight, then chilled and filtered. The air dried, chocolate brown crude N,N'-dithiooxalylbis-2-aminopentanoic acid weighed 90.8 g. (Yield: 67%). To purify the crude product it was first dissolved in sodium carbonate solution and reprecipitated with hydrochloric acid, then reprecipitated (as an oil) by diluting a methanol solution with water. Both the aqueous and methanol solutions were treated with decolorizing charcoal. Yellow crystals of purified N,N'-dithiooxalylbis-2-aminopentanoic acid were obtained by treating the oily precipitate from the methanol solution with chloroform. Yield 16.1 g.; M.P., 198° C. (with decomposition). A second crop of 1.5 g. of the purified product was obtained by working up the mother liquors and washings from the first crop. Calculated for $C_{12}H_{20}N_2O_4S_2$: N, 8.74%; S, 20.01%; neutral equivalent, 160. Found: N, 8.4%; S, 20.6%; neutral equivalent, 162.

EXAMPLE 5

N,N'-Dithiooxalylbis-3-Aminopropionic Acid

Beta-aminopropionic acid (beta-alanine) (112 g., 1.26 mol) and sodium bicarbonate (106 g., 1.26 mol) were dissolved in warm water (800 ml.), and dithiooxamide (75.5 g., 0.63 mol) was added in portions with stirring. More water (400 ml.) was added and the mixture was stirred for 7.5 hours at 45–50° C. then stirred overnight without heating. The following morning the lighter color of the suspended material indicated that the reaction was complete. The slurry was filtered and dilute hydrochloric acid (1.28 mols of HCl) was slowly added to the dark filtrate with stirring, to precipitate crude N,N'-dithiooxalylbis-3-aminopropionic acid. The slurry was cooled to 5° C. and filtered, and the precipitate was washed with water and dried 2.5 hours at 100° C. Yield: 105.4 g. of reddish-brown crude N,N'-dithiooxalylbis-3-aminopropionic acid (63% of theory) M.P. 192–195° C. Crude N,N'-dithiooxalylbis-3-aminopropionic acid (25 g.) was recrystallized from water (1.1), the hot solution being treated with decolorizing carbon which was filtered off before crystallization began. The crystalline product was filtered from the cold solution, washed, and dried 2 hours at 100° C. Yield of orange, purified N,N'-dithiooxalylbis-3-aminopropionic acid 10.7 g. M.P.: 199–202° C. Calculated for $C_8H_{12}N_2O_4S_2$: C, 36.35%; H, 4.58%; N, 10.60%; S, 24.26%; neutral equivalent, 132.2. Found: C, 36.9%; H, 4.9%; N, 10.4%; S, 24.9%; neutral equivalent, 132.

EXAMPLE 6

N,N'-Dithiooxalylbis-2-Aminopropionic Acid

Alanine (alpha-aminopropionic acid) (85 g., 0.955 mol) and sodium bicarbonate (80 g., 0.955 mol) were dissolved in water (500 ml.). Dithiooxamide (57.3 g., 0.478 mol) was added and the mixture was stirred for 72 hours, during which it was heated intermittently to 50–55° C. The nearly clear solution was filtered and acidified with hydrochloric acid (1.56 mol HCl). The precipitation mixture was chilled and filtered and the wet filter cake was dissolved in hot methanol (200 ml.), treated with decolorizing charcoal, and filtered. Water (150 ml.) was added to the hot filtrate and the mixture was chilled. The crude yellow-brown N,N'-dithiooxalylbis-2-aminopropionic acid was filtered off, washed and dried at 100° C. Yield: 40.6 g. (32%). A sample darkened above 185° C. and melted with decomposition at 202° C.

A portion (5 g.) of the crude product was recrystallized by cooling and adding water to a methanol solution that had been twice treated with decolorizing carbon. The recrystallized N,N'-dithiooxalylbis-2-aminopropionic acid was yellow. Yield: 2.3 g. (46% on recrystallization). Calculated for $C_8H_{12}N_2O_4S_2$: N, 10.60%; S, 24.26%. Found: N, 10.14%; S, 25.24%.

EXAMPLE 7

N,N'-Dithiooxalylbis-6-Aminohexanoic Acid 6-aminocaproic acid (70.2 g.; 0.54 mol) and sodium carbonate (28.5 g.; 0.27 mol) were dissolved in water (250 ml.). The filtered solution was added to dithiooxamide (32.2 g., 0.27 mol) and the mixture was stirred and heated until the reactants had dissolved. The resulting red-brown solution was treated with decolorizing charcoal and filtered, hydrochloric acid (0.96 mol HCl) was added, and the filtrate was cooled. The yellow-red precipitate of crude N,N'-dithiooxalylbis-6-aminohexanoic acid was filtered off and recrystallized twice from ethanol. The resulting yellow crystals of N,N'-dithiooxalylbis-6-aminohexanoic acid melted at 140.5–142° C. Yield, 45%. Calculated for $C_{14}H_{24}N_2O_4S_2$: neutral equivalent, 174.2. Found: neutral equivalent, 178.2.

EXAMPLE 8

*Disodium Salt of N,N'-Dithiooxalylbis-2-Aminoethanesulfonic Acid*

Dithiooxamide (6 g., 0.05 mol), taurine (2-aminoethanesulfonic acid, 12.5 g., 0.10 mol) and sodium bicarbonate (8.4 g.; 0.10 mol) were agitated in water (50 ml.) on a steam bath for several hours, during which the reaction mixture darkened and the appearance of the undissolved material changed. The mixture was filtered and the residue washed and air dried. This crude product was recrystallized from water (8 parts) and the resulting purified disodium salt of N,N'-dithiooxalylbis-2-aminoethanesulfonic acid was yellowish-orange. Yield, 37%. Calculated for $C_6H_{10}N_2O_6S_4Na_2$: N, 7.36%; S, 33.72%. Found: N, 8.0%; S, 33.4%.

EXAMPLE 9

*N,N'-Dithiooxalylbis-2-Aminoethanesulfonic Acid*

Disodium salt of N,N'-dithiooxalylbis-2-aminoethanesulfonic acid was dissolved in water and hydrochloric acid was added to precipitate N,N'-dithiooxalylbis-2-aminoethanesulfonic acid.

It will be understood that the invention embraces other compounds in addition to those whose detailed preparation is described in the preceding working examples. Such compounds are conveniently prepared by following the methods described above and substituting amino acids other than those specifically named. Exemplary of such other amino acids are valine, leucine, norleucine, and isoleucine. Also, it will be understood that salts of these novel N,N'-dithiooxalylbis-amino acids other than the disodium salt, such as dipotassium, nickel, cobalt and copper, etc., salts are conveniently prepared either by the method described in the foregoing examples or by methods well known to those skilled in the art.

In view of the above, it will be seen that the several objects of the invention are achieved and other advantageous results attained.

As many changes could be made in the above products and methods without departing from the scope of the invention, it is intended that all matter contained in the above description shall be interpreted as illustrative and not in a limiting sense.

I claim:
1. A compound selected from the group consisting of a dibasic acid of the general formula:

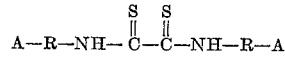

in which R represents a lower alkylene radical selected from the group consisting of methylene, polymethylene, and alkyl-substituted methylene radicals, and A represents a monobasic organic acid radical selected from the group consisting of carboxyl and sulfonic radicals, and the salts thereof.
2. N,N'-dithiooxalylbis-aminoacetic acid.
3. N,N'-dithiooxalylbis-3-aminopropionic acid.
4. N,N'-dithiooxalylbis-2-aminoethanesulfonic acid.
5. Disodium salt of N,N'-dithiooxalylbis-2-aminoethanesulfonic acid.
6. Amino acid derivatives of dithiooxamide having the formula

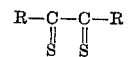

in which R represents a radical derived from an aliphatic alpha-amino acid by removal of a hydrogen atom from the alpha-amino group.
7. The method which comprises reacting dithiooxamide with the salt of a lower monobasic amino acid of the general formula $H_2N—R—A$, in which R represents a lower alkylene radical selected from the group consisting of methylene, polymethylene and alkyl-substituted methylene radicals, and A represents a monobasic organic acid radical selected from the group consisting of carboxyl and sulfonic acid radicals, in an inert reaction medium to form the salt of an N,N'-dithiooxalylbis-amino acid.
8. The method which comprises reacting dithiooxamide with the salt of a lower monobasic amino acid of the general formula $H_2N—R—A$, in which R represents a lower alkylene radical selected from the group consisting of methylene, polymethylene and alkyl-substituted methylene radicals, and A represents a monobasic organic acid radical selected from the group consisting of carboxyl and sulfonic acid radicals, in an inert reaction medium to form the salt of an N,N'-dithiooxalylbis-amino acid, and thereafter forming the N,N'-dithiooxalylbis-amino acid by the addition of a mineral acid.

References Cited in the file of this patent
UNITED STATES PATENTS 2,830,085    Doerner _____ Apr. 8, 1958

OTHER REFERENCES

Kerp et al.: Berichte der Deutsche Chemische Gesellschaft, vol. 30, pages 579–585 (7 pages), 1897.

UNITED STATES PATENT OFFICE
CERTIFICATE OF CORRECTION

Patent No. 3,023,232            February 27, 1962

Vernon H. Wallingford

It is hereby certified that error appears in the above numbered patent requiring correction and that the said Letters Patent should read as corrected below.

Column 1, line 12, beginning with "Broadly, the invention" strike out all to and including "the alpha-amino group.", in line 20, same column 1; line 21, for "More particularly" read -- Briefly --.

Signed and sealed this 26th day of June 1962.

(SEAL)
Attest:

ERNEST W. SWIDER                  DAVID L. LADD
Attesting Officer                  Commissioner of Patents